United States Patent [19]

Lee

[11] Patent Number: 5,760,685
[45] Date of Patent: Jun. 2, 1998

[54] APPARATUS FOR AND METHOD OF CONTROLLING TAIL LAMPS OF VEHICLE

[75] Inventor: Shi Hyong Lee, Kyonggi-do, Rep. of Korea

[73] Assignee: KIA Motors Corporation, Seoul, Rep. of Korea

[21] Appl. No.: 672,845

[22] Filed: Jul. 25, 1996

[30] Foreign Application Priority Data

Jul. 8, 1996 [KR] Rep. of Korea .................. 1996-27454

[51] Int. Cl.$^6$ ..................................................... B60Q 1/26
[52] U.S. Cl. ..................... 340/468; 340/458; 340/457; 340/474; 307/10.8
[58] Field of Search ..................... 340/458, 457, 340/468, 474; 307/10.8

[56] References Cited

U.S. PATENT DOCUMENTS

| 2,722,673 | 11/1955 | Turner | 340/451 |
|---|---|---|---|
| 3,737,848 | 6/1973 | Hayden | 340/474 |
| 4,435,648 | 3/1984 | Goode, III | 307/10 R |
| 4,565,991 | 1/1986 | Lupoli et al. | 340/438 |

FOREIGN PATENT DOCUMENTS 1992-535  1/1992  Rep. of Korea .

1454978  11/1976  United Kingdom .

*Primary Examiner*—Jeffery Hofsass
*Assistant Examiner*—Julie Lieu
*Attorney, Agent, or Firm*—Lowe, Price, LeBlanc & Becker

[57] ABSTRACT

An apparatus for and a method of controlling tail lamps of a vehicles capable of giving an alarm to the driver when the door of the vehicle is opened in ON state of the tail lamps, thereby ensuring the driver to recognize the ON state of the tail lamps. The apparatus includes a tail lamp switch unit provided with a tail lamp switch adapted to manually turn on/off the tail lamps, the tail lamp switch unit serving to convert a switched state of the tail lamp switch into an electrical signal, a door opening/closing switch unit provided with a door opening/closing switch operatively connected to a door of the vehicle, the door opening/closing switch unit serving to convert a switched state of the door opening/closing switch into an electrical signal, a control unit for generating a control signal to generate an alarm when the door is opened in a turned-on state of the tail lamps, based on the electrical signals respectively received from the tail lamp switch unit and the door opening/closing switch unit, a tail lamp unit provided with the tail lamps, the tail lamp unit being turned on or off under a control of the control unit, and an alarming unit for generating an alarm in accordance with the control signal from the control unit. The apparatus is designed by use of digital circuits so that it can have a simple circuit arrangement.

5 Claims, 2 Drawing Sheets

APPARATUS FOR AND METHOD OF CONTROLLING TAIL LAMPS OF VEHICLE

BACKGROUND OF THE INVENTION

1. Field of the Invention

The present invention relates to an apparatus for and a method of controlling tail lamps of a vehicle, and more particularly to an apparatus for and a method of controlling tail lamps of a vehicle, capable of giving an alarm to the driver when the door of the vehicle is opened in ON state of the tail lamps, thereby ensuring the driver to recognize the ON state of the tail lamps. The apparatus of the present invention is designed by use of digital circuits so that it can have a simple circuit arrangement.

2. Description of the Prior Art

Typically, vehicles are provided with lamps having a signalling function as well as lamps providing a wide range of vision. The lamps for providing a wide range of vision include head lamps, fog lamps, interior lamps, and backing lamps. On the other hand, the lamps having a signalling function include direction lamps, tail lamps, car number lamps, and brake lamps. All vehicles are essentially attached with such functional lamps each having a module size to satisfy its purpose. The tail lamps are mounted on the rear portion of a vehicle to inform following vehicles of the width of the vehicle at night.

When a driver gets out of his vehicle while forgetting the fact that the tail lamps are in ON state, the battery is unnecessarily discharged due to the turned-on tail lamps.

In order to solve such a problem, a technique has been proposed which is adapted to automatically turn off the tail lamps and head lamps even when the driver gets out of his vehicle without turning off those lamps, thereby preventing an unnecessary discharge of the battery. Such a technique is disclosed in Korean Utility Model Publication No. 92-535 "Apparatus for Automatically Turning off Lamps of Vehicle" published on Jan. 15, 1992.

However, the automatic lamp turning-off apparatus disclosed in the above patent has a problem in that its circuit is complex because the circuit is designed in an analog fashion. Furthermore, the tail lamps, which were automatically turned off upon opening the door, are not automatically turned on when the door is closed. The apparatus is constructed to turn on the tail lamps only when the driver switches on a tail lamp switch. Due to such a construction, there is a troublesome in that where the driver opens the door and then closes it without getting out of his vehicle, he should switch on the tail lamp switch to turn on the tail lamps which have been automatically turned off upon opening the door.

SUMMARY OF THE INVENTION

Therefore, an object of the invention is to solve the above-mentioned problems involved in the prior art and to provide an apparatus for and a method of controlling tail lamps of a vehicle, capable of giving an alarm to the driver when the door of the vehicle is opened in ON state of the tail lamps, thereby ensuring the driver to recognize the ON state of the tail lamps.

Another object of the invention is to provide an apparatus for controlling tail lamps of a vehicle, which is designed by use of digital circuits so that it can have a simple circuit arrangement.

In accordance with one aspect, the present invention provides an apparatus for controlling tail lamps of a vehicle, comprising: a tail lamp switch unit provided with a tail lamp switch adapted to manually turn on/off the tail lamps, the tail lamp switch unit serving to convert a switched state of the tail lamp switch into an electrical signal; a door opening/closing switch unit provided with a door opening/closing switch operatively connected to a door of the vehicle, the door opening/closing switch unit serving to convert a switched state of the door opening/closing switch into an electrical signal; a control unit for generating a control signal to generate an alarm when the door is opened in a turned-on state of the tail lamps, based on the electrical signals respectively received from the tail lamp switch unit and the door opening/closing switch unit; a tail lamp unit provided with the tail lamps, the tail lamp unit being turned on or off under a control of the control unit; and an alarming unit for generating an alarm in accordance with the control signal from the control unit.

In accordance with another aspect, the present invention provides a method for controlling tail lamps of a vehicles, comprising the steps of: starting a procedure of controlling the tail lamps in a power-on state, and then reading a signal generated from the tail lamp switch; determining whether or not a tail lamp switch is in its ON state, based on the signal from the tail lamp switch; turning off the tail lamps when the tail lamp switch is in its OFF state; turning on the tail lamps when the tail lamp switch is in its ON state; reading a signal generated from a door opening/closing switch; determining whether or not the door opening/closing switch is in its ON state, based on the signal from the door opening/closing switch; and giving an alarm to the driver when the door opening/closing switch is in its ON state.

In accordance with another aspect, the present invention provides a computer-readable memory stored with: instruction means for starting a procedure of controlling the tail lamps in a power-on state, and then reading a signal generated from the tail lamp switch; instruction means for determining whether or not a tail lamp switch is in its ON state, based on the signal from the tail lamp switch; instruction means for turning off the tail lamps when the tail lamp switch is in its OFF state; instruction means for turning on the tail lamps when the tail lamp switch is in its ON state; instruction means for reading a signal generated from a door opening/closing switch; instruction means for determining whether or not the door opening/closing switch is in its ON state, based on the signal from the door opening/closing switch; and instruction means for giving an alarm to the driver when the door opening/closing switch is in its ON state.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
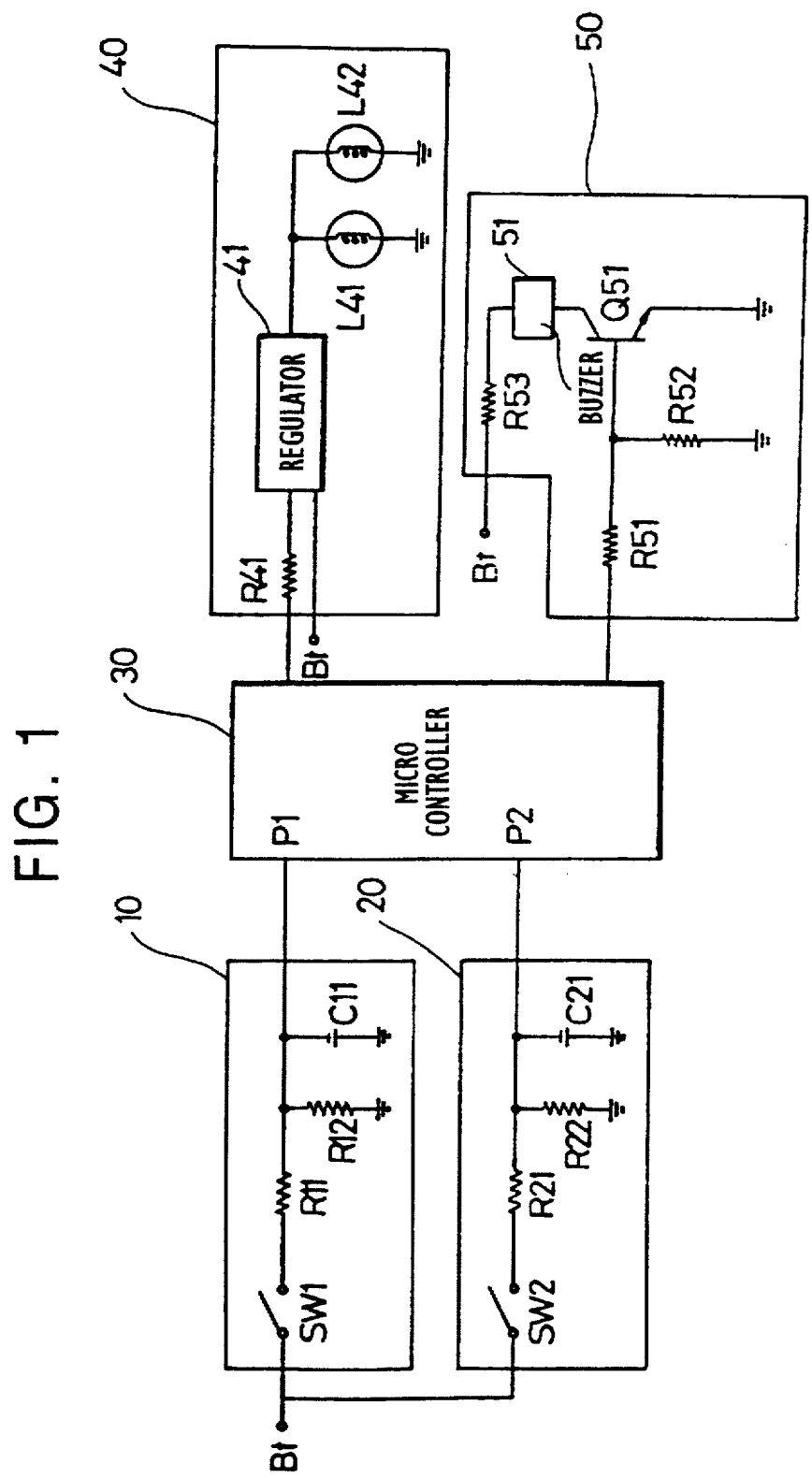
FIG. 1 is a circuit diagram illustrating an apparatus for controlling tail lamps of a vehicle in accordance with an embodiment of the present invention.

FIG. 1 is a circuit diagram illustrating an apparatus for controlling tail lamps of a vehicle in accordance with an embodiment of the present invention.

As shown in FIG. 1, the apparatus of the present invention includes a tail lamp switch unit 10 coupled to a battery B+ at its input terminal and a door opening/closing switch 20 coupled to the battery B+ at its input terminal. A micro controller 30 is connected to the output terminals of the tail lamp switch unit 10 and door opening/closing switch 20 at its input terminals P1 and P2, respectively. The apparatus also includes a tail lamp unit 30 coupled to one output terminal of the micro controller 30 and an alarming unit 50 coupled to another output terminal of the micro controller 30.

The tail lamp switch unit 10 includes a tail lamp switch SW1 coupled at one terminal thereof to the battery B+, a resistor R11 coupled at one end thereof to the other terminal of the tail lamp switch SW1, a resistor R12 coupled between the other end of the resistor R11 and the ground, and a capacitor C11 coupled between the node of the resistors R11 and R12 and the ground.

The door opening/closing switch unit 20 includes a door opening/closing switch SW2 coupled at one terminal thereof to the battery B+, a resistor R21 coupled at one end thereof to the other terminal of the door opening/closing switch SW2, a resistor R22 coupled between the other end of the resistor R21 and the ground, and a capacitor C21 coupled between the node of the resistors R21 and R22 and the ground.

The micro controller 30 is provided with an internal memory.

The tail lamp unit 40 includes a resistor R41 connected at one end thereof to one output terminal of the micro controller 30, a regulator 41 connected to both the other end of the resistor R41 and the battery B+ respectively at its input terminals, and a pair of tail lamps L41 and L42 connected in parallel between the output terminal of the regulator 41 and the ground.

On the other hand, the alarming unit 50 includes a resistor R51 coupled at one end thereof to the other output terminal of the micro controller 30, a resistor R52 coupled between the other end of the resistor R51 and the ground, a transistor Q51 coupled at its base to the node of the resistors R51 and R52 and coupled at its emitter to the ground, a buzzer 51 coupled at one terminal thereof to the collector of the transistor Q51, and a resistor R53 coupled between the other terminal of the buzzer and the battery B+.

Figure 2:
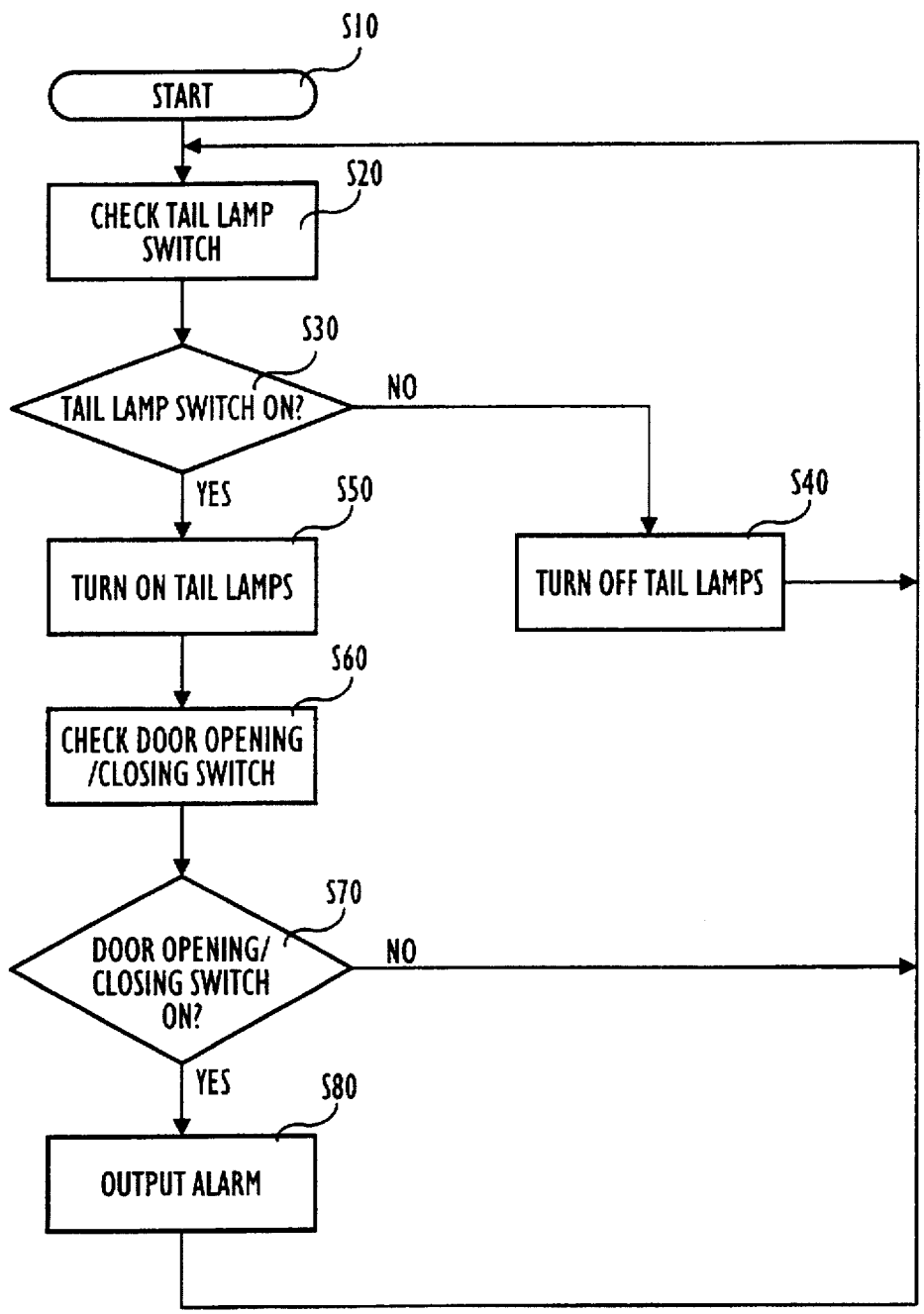
FIG. 2 is a flow chart illustrating a method for controlling tail lamps of a vehicle in accordance with another embodiment of the present invention.

FIG. 2 is a flow chart illustrating a method for controlling tail lamps of a vehicle in accordance with another embodiment of the present invention.

As shown in FIG. 2, the method of the present invention includes the steps of powering on the micro controller to start the procedure of controlling the tail lamps (Step S10), reading a signal from the tail lamp switch (Step S20), and determining whether or not the tail lamp switch is in its ON state, based on the signal received from the tail lamp switch (Step S30). The method further includes the steps of turning off the tail lamps when the tail lamp switch is in its OFF state (Step S40), turning on the tail lamps when the tail lamp switch is in its ON state (Step S50), reading a signal from the door opening/closing switch (Step S60), determining whether or not the door opening/closing switch is in its ON state, based on the signal received from the door opening/closing switch (Step S70), and giving an alarm to the driver when the door opening/closing switch is in its ON state (Step S80).

Now, the operation of the tail lamp controlling apparatus having the above-mentioned arrangement carried out in accordance with the above-mentioned control method will be described.

When the micro controller 30 of the tail lamp apparatus is powered on, the procedure of FIG. 2 stored in the form of a program in the internal memory of the micro controller 30 is executed. Accordingly, the operation of the tail lamp apparatus is started (Step S10).

Once the tail lamp apparatus starts to operate, its micro controller 30 initializes all memory parameters and then reads a signal output from the tail lamp switch unit 10 (Step S20). Based on the signal received from the tail lamp switch unit 10, the micro controller 30 determines whether the tail lamp switch SW1 is in its ON state (Step S30).

The tail lamp switch SW1 is a switch mounted near the driver's seat so that the driver can manipulate it to turn on the tail lamps L41 and L42 at night. When the tail lamp switch SW1 is switched on, the power from the battery B+ is applied to the input terminal P1 of the micro controller 30 via the resistors R11 and R12 and capacitor C11. Based on the applied voltage, the micro controller 30 can determine whether the tail lamp switch SW1 is in its ON state.

Where the tail lamp switch SW1 of the tail lamp switch unit 10 is in its OFF state, the micro controller 30 generates a control signal which is, in turn, sent to the regulator 41 of the tail lamp unit 40. In accordance with the received control signal, the regulator 41 cuts off the power from the battery B+ applied to the tail lamps L41 and L42. As a result, the tail lamps L41 and L42 are turned off (Step S40).

On the other hand, where the tail lamp switch SW1 of the tail lamp switch unit 10 is in its ON state, the micro controller 30 generates a control signal which is, in turn, sent to the regulator 41 of the tail lamp unit 40. Based on the control signal from the micro controller 30, the regulator 41 allows the power from the battery B+ to be applied to the tail lamps L41 and L42. As a result, the tail lamps L41 and L42 are turned on (Step S50).

Thereafter, the micro controller 30 reads a signal output from the door opening/closing switch unit 20 (Step S60). Based on the read signal, the micro controller 30 determines whether the door opening/closing switch SW2 is in its ON state (Step S70).

The door opening/closing switch SW2 is a switch which is operatively connected to the driver-side door so that it can be switched between its ON and OFF states in accordance with the opening/closing state of the door. When the door opening/closing switch SW2 is switched on, the power from the battery B+ is applied to the input terminal P2 of the micro controller 30 via the resistors R21 and R22 and capacitor C21. Based on the applied voltage, the micro controller 30 can determine whether the door opening/closing switch SW2 is in its ON state.

Where the door opening/closing switch SW2 of the door opening/closing switch unit 20 is in its ON state, the micro controller 30 generates a control signal which is, in turn, sent to the alarming unit 50. By the control signal from the micro controller 30, the transistor Q51 is turned on, thereby causing the buzzer 51 to generate an alarm (Step S80).

As apparent from the above description, the present invention provides an apparatus for and a method of controlling tail lamps of a vehicle, capable of giving an alarm to the driver when the door of the vehicle is opened in ON state of the tail lamps, thereby ensuring the driver to recognize the ON state of the tail lamps. The apparatus of the present invention is designed by use of digital circuits so that it can have a simple circuit arrangement.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling tail lamps of a vehicle, comprising:

a tail lamp switch unit provided with a tail lamp switch adapted to manually turn on/off the tail lamps, the tail lamp switch unit serving to convert a switched state of the tail lamp switch into an electrical signal;

a door opening/closing switch unit provided with a door opening/closing switch operatively connected to a door of the vehicle, the door opening/closing switch unit serving to convert a switched state of the door opening/closing switch into an electrical signal wherein the door opening/closing switch unit comprises a door opening/closing switch coupled at one terminal thereof to a battery, a pair of voltage-dividing resistors coupled to the other terminal of the door opening/closing switch, and a capacitor coupled between a node of the voltage dividing resistors and the ground;

a control unit including a microcontroller having an internal memory for generating a control signal to generate an alarm when the door is opened in a turned-on state of the tail lamps, based on the electrical signals respectively received from the tail lamp switch unit and the door opening/closing switch unit;

a tail lamp unit provided with the tail lamps, the tail lamp unit being turned on or off under a control of the control unit and including a regulator for regulating power from a battery; and an alarming unit for generating an alarm in accordance with the control signal from the control unit.

2. The apparatus in accordance with claim 1, wherein the tail lamp switch unit comprises:

the tail lamp switch coupled at one terminal thereof to a battery;

a pair of voltage-dividing resistors coupled to the other terminal of the tail lamp switch; and a capacitor coupled between a node of the voltage-dividing resistors and the ground.

3. The apparatus in accordance with claim 1, wherein the tail lamps are coupled in parallel between an output terminal of the regulator and the ground.

4. The apparatus in accordance with claim 1, wherein the alarming unit comprises:

a pair of voltage-dividing resistors coupled to an output terminal of the control unit;

switching means having a control terminal coupled to a node of the voltage-dividing resistors; and a buzzer adapted to generate an alarm in accordance with a switched state of the switching means.

5. The apparatus in accordance with claim 1, wherein the regulator regulates at a constant voltage under control of the control unit.

* * * * *